US007936901B2

(12) United States Patent
Jancke

(10) Patent No.: US 7,936,901 B2
(45) Date of Patent: *May 3, 2011

(54) SYSTEM AND METHOD FOR ENCODING HIGH DENSITY GEOMETRIC SYMBOL SET

(75) Inventor: Gavin Jancke, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,464

(22) Filed: Dec. 14, 2009

(65) Prior Publication Data

US 2010/0147961 A1 Jun. 17, 2010

Related U.S. Application Data

(63) Continuation of application No. 11/022,863, filed on Dec. 28, 2004, now Pat. No. 7,751,585.

(51) Int. Cl.
  *G06K 9/00* (2006.01)
(52) U.S. Cl. ............. 382/100; 235/494; 235/462.09; 235/462.04; 235/462.16; 235/162.41
(58) Field of Classification Search .......... 382/100; 235/462.04, 462.09, 462.02, 462.41, 462.16, 235/468, 469

See application file for complete search history.

(56) References Cited

U.S. PATENT DOCUMENTS

| | | | | |
|---|---|---|---|---|
| 3,959,631 A * | 5/1976 | Otten | ............. | 235/493 |
| 4,745,269 A * | 5/1988 | Van Gils | ............. | 235/487 |
| 6,070,805 A * | 6/2000 | Kaufman et al. | ............. | 235/494 |
| 6,232,984 B1 * | 5/2001 | Chuah et al. | ............. | 345/441 |
| 6,757,445 B1 * | 6/2004 | Knopp | ............. | 382/285 |
| 7,197,644 B2 * | 3/2007 | Brewington | ............. | 713/176 |
| 2002/0057204 A1 * | 5/2002 | Bligh | ............. | 340/691.1 |

FOREIGN PATENT DOCUMENTS

WO    WO 2005086076 A1 *  9/2005

* cited by examiner

*Primary Examiner* — Brian Q Le
*Assistant Examiner* — Mekonen Bekele
(74) *Attorney, Agent, or Firm* — Shook, Hardy & Bacon L.L.P.

(57) ABSTRACT

A system and related techniques provide a platform for encoding high density geometric symbol sets, for example a triangular barcode-type of encoding which may be used to encode drivers' licenses, biometric IDs, passports, or other transaction or identification media. According to embodiments of the invention in one regard, an inkjet, laser or other printer or output device may imprint a paper, plastic or other media with geometric symbols such as triangles in a defined array, to represent, for instance, name, address, or other identifying information, for instance such as digital facial photographs, iris or retinal scans, fingerprints, signatures, or other information. The geometric symbols may in one regard be arranged in a staggered format, separated in embodiments by a white space that may serve to reduce aliasing effects and other distortions. Because triangular symbols may in general be packed more closely together, and the number of distinct individual symbols may scale according to the range of color space employed for the symbol set, information densities high enough to satisfactorily encode biometric iris or retinal scans, digital facial photographs, or other identification or other information may be achieved. In embodiments, error correcting processing such as Reed-Solomon techniques may be employed to enhance scanning accuracy. In further embodiments, a reference palette may be embedded within the imprinted media, to provide a scale against which color fading or other distortion may be measured.

14 Claims, 9 Drawing Sheets

UPC CODE

ORIGINAL CAPTURE        ROTATED        SCALED $$C1-C2 = \sqrt{2 \times (R1-R2)^2 + 4 \times (G1-G2)^2 + 3 \times (B1-B2)^2}$$

SYSTEM AND METHOD FOR ENCODING HIGH DENSITY GEOMETRIC SYMBOL SET

CROSS-REFERENCE TO RELATED APPLICATION

This application is a continuation of and claims benefit of priority to U.S. patent application Ser. No. 11/022,863, filed on Dec. 28, 2004, which application is herein incorporated by reference. The subject matter of this application is also related to the subject matter of U.S. Provisional Application Ser. No. 60/583,571 filed Jun. 28, 2004 entitled "Ultra High Density Triangular Symbology Color Barcode Format", which application is assigned or obligation of assignment to the same entity as this application, from which application priority is claimed, and which application is incorporated by reference.

STATEMENT REGARDING FEDERALLY SPONSORED RESEARCH OR DEVELOPMENT

Not applicable.

FIELD OF THE INVENTION

The invention relates to the field of symbol encoding in identifications and transactional media, and more particularly to systems and methods for encoding bar code or other symbol sets in a color or grayscale space using geometric symbol sets.

BACKGROUND OF THE INVENTION

Widespread bar code and other encoding technologies such as the universal product code (UPC) encoded on retail products, driver's licenses and other commercial or identification media rely upon predefined symbol sets defined for certain positions and sizes within labels and other materials. A traditional UPC, such as that illustrated in FIG. 1, and related codes however do not achieve a particularly high information density in terms of bits embedded per square inch, achieving on the order of 100-300 bits per square inch. This is due in one regard to the length and width of the code or symbol dimensions, which are comparatively elongated. This is also due in another regard to the limitation of the encoding technology to a black and white color scheme, in which the presence or absence of individual bits is represented by a single black or white mark or symbol.

While this encoding scheme may enhance detection robustness because the separation between coding symbols in terms of color space distance is greatest, and permit the use of relatively low-cost or low-resolution scanners because only black and white elements need to be discriminated, a price is paid in terms of information density. Simple black and white bar codes have therefore as a rule proved insufficient or impractical for transaction or identification applications which demand greater overall information content. Biometric IDs or medical insurance or information cards, for instance, may require the encoding of personal information such as an iris scan, a fingerprint image, a signature image, medical history, DNA or other information. In may applications, it is desirable to imprint that information on a comparatively compact plastic or paper card or other relatively inexpensive media, rather for instance than resort to the much more expensive solution of a smart card containing electronic intelligence. Drivers' licenses, passports or other ID media may likewise require a fairly high amount of information content, including for example color digital face photographs.

As the pixel resolution of both printing devices such as laser printers and detection devices such as handheld scanners has increased, the possibility has correspondingly arisen to enlarge both the symbol set and the color space in which bar and other symbol codes may be expressed. Printing devices, and scanning or input devices in particular have become available which are capable of close-contact optical or other scans at color depth resolutions of 8 bits (256 grayscale or color), 24, 32, 48 or greater bit depths. Enlarged color spaces combined with finer spatial resolution creates the potential for greater information density on media.

Yet encoding for example a driver's license or biometric identification card at 32 bits per pixel at 200 lines per inch using square or block symbols may still result in scanning errors from discolored paper, pixelation, rotation or other misalignment or other problems in reading the media and its symbols. Thus while information density may increase compared to single-line two-color codes, accuracy or ultimate density in cases may still be compromised or comparatively limited when using gray-scale or color encoded in square or block symbol sets. Other problems in bar code and other encoding technology exist.

SUMMARY OF THE INVENTION

The invention overcoming these and other problems in the art relates in one regard to a system and method for encoding a high density geometric symbol set, in which a triangular or other geometric barcode format is provided using a comparatively densely packed symbol pattern that can in one regard achieve at least three times the density of industry standard single-line barcode formats such as PDF417/Datamatrix. According to embodiments of the invention in one regard, the encoded symbol set may include built-in error detection or correction capabilities that can in cases achieve at least over 1,100 bytes or 3,300 symbols per square inch, even when printed on a conventional color inkjet printer. According to embodiments of the invention in one regard, triangular or other geometric symbol sets may be embedded with white spaces which serve as a partition between adjacent symbols, enhancing detection accuracy. According to embodiments of the invention in another regard, the encoded symbol set may be expressed in gray-scale or color tones, at 8, 24, 32, 48 or other bit depths, depending on application.

BRIEF DESCRIPTION OF THE DRAWINGS

The present invention is described in detail below with reference to the attached drawing figures, wherein.

DETAILED DESCRIPTION OF EMBODIMENTS

Figure 1:
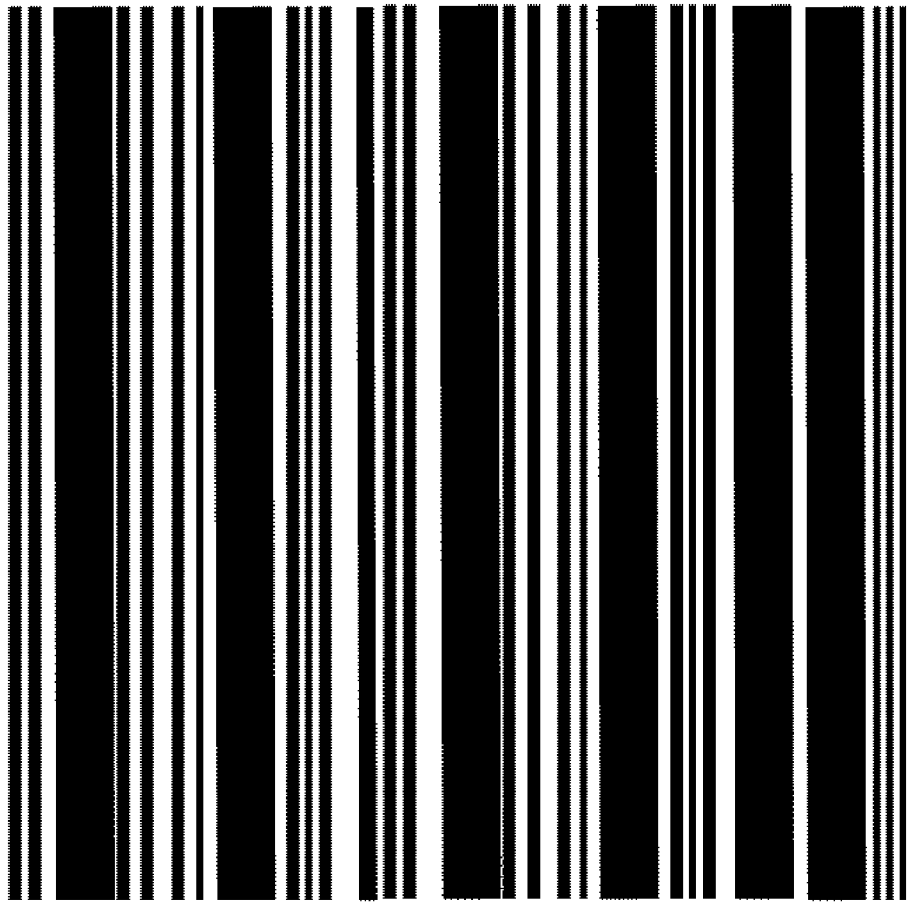
FIG. 1 illustrates a Universal Product Code (UPC), according to known technology.
Figure 2:
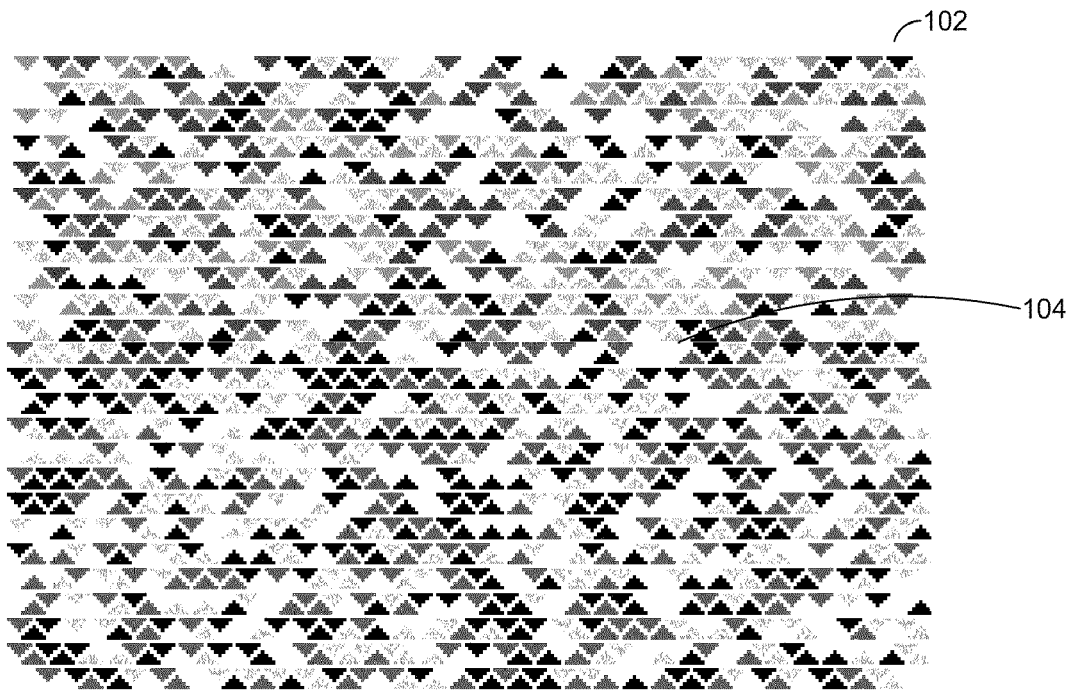
FIG. 2 illustrates a geometric symbol set for encoding data at high density, according to embodiments of the invention.

FIG. 2 illustrates an encoded high density symbol set 102 according to embodiments of the invention in one regard. According to embodiments, each symbol in the symbol set 102 may be represented by a colored geometric figure, such as a triangle or other figure. Each symbol may be represented by or encoded in a grayscale or color, such as a 2-bit (four color), 3-bit (eight color), 4-bit (sixteen colors), 8-bit (256 color), 24-bit (16.7 million colors), 32-bit (16.7 million colors plus alpha channel, or other colors), 48-bit or other color depth or color density. The issues and process for creating and decoding grayscale and color codes may in one regard be similar. For purposes of illustration, in embodiments a color representation of or format for symbol set 102 may generally be described.

According to embodiments of the invention in one regard, each individual symbol within symbol set 102 may be or include a color or grayscale triangle or other geometric shape or object that is distinctly spaced from its neighbors. According to embodiments of the invention in a further regard, and as shown, at the end of the barcode a reference palette 104 may be presented which displays a known reference range of colors that is being represented.

Figure 3:
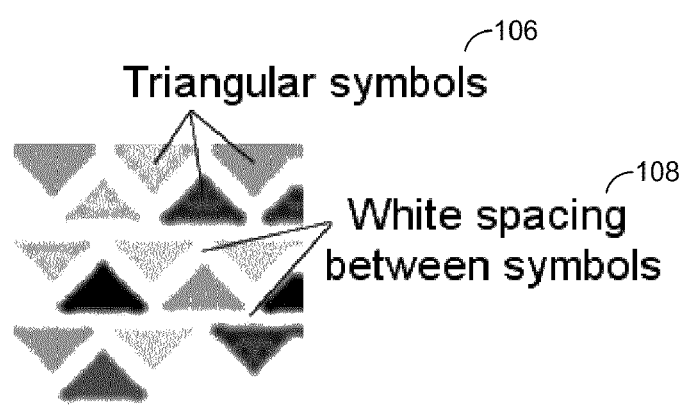
FIG. 3 illustrates an aspect of a geometric symbol set including white space separators, according to embodiments of the invention.

FIG. 3 illustrates a zoomed view of a portion of symbol set 102 shown in FIG. 2, including triangular symbols 106 and white spacing 108 between those symbols. This symbol set 102 may for instance be scanned using a high-fidelity computer image capture device such as a flatbed scanner, business card scanner, CCD based camera or other close-contact or other scanning or input device. In order to describe certain features of the symbology and related encoding issues according to the invention, a brief outline or recapitulation of computer image capture and computer graphics and color theory is presented.

Computer image capture devices essentially capture an electronic or optical impression of a real world picture or scene, and convert it into a binary form that a computer and other digital equipment can process. Different types of digital representations of images, or bitmaps, within a computer are known. A computer capture device such as a digital still camera contains electronic sensors that are able to take an optical image viewed through a lens, and convert it into a known digital representation. An image may be decomposed into small single image squares or other elements called pixels which have a value that denotes the pixel's color information or representation. In general the greater the number of pixels for a given scene, the better the clarity and real-world representation of the image when expressed as a bitmap. A color pixel in a 24-bit depth bitmap may for example be represented as a range of Red 0-255, Green 0-255 and Blue 0-255 values. This RGB triplet can then be rendered to a display or printing device which can produce the original color when viewed by the human eye. Images encoded in digital form may, for example, be stored in conventional file formats such as a Joint Photographic Experts Group (JPG), tagged image format file (TIFF), bitmap (BMP), graphic image format (GIF), portable network graphics (PNG) or other formats or files.

Figure 4:
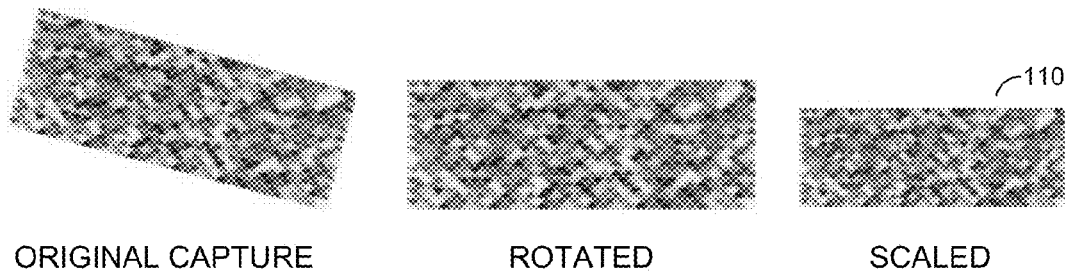
FIG. 4 illustrates certain rotation and scaling operations, according to embodiments of the invention.

Once a bitmap representation of an image has been captured or received, a computer graphics application or other program may generally process the image in some form in order to manipulate the captured information. In the case of embodiments of this invention, the barcode or other encoding algorithm may rotate the captured image, and scale it to a known working size, as needed. This allows precise examination and decoding of the triangular symbols 106. FIG. 4 illustrates these steps, which results in a scaled image 110.

Figure 5:
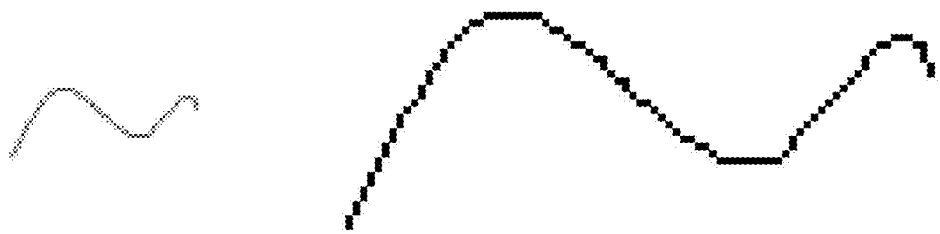
FIG. 5 illustrates aliasing effects which may be manifested in certain image capture operations.

A persistent artifact in analog to digital conversion and computer image manipulation, such as rotation or scaling, is generally known as aliasing. "Aliasing" refers to a term describing an effect when analog information is converted to and represented in the digital domain. FIG. 5 illustrates this type of effect. On the left is shown a hand-drawn line, and on the right is the line when captured and represented on a computer. The digital conversion of the line maps the analog line onto a grid, essentially filling any grid square through which the line passes. Squares/pixels are either occupied (black) or empty (white). There is no half filling.

Figure 6:
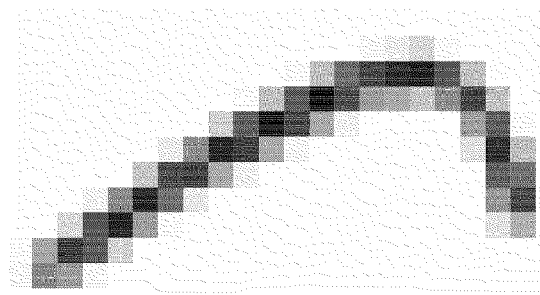
FIG. 6 illustrates aliasing and pixelation effects which may be manifested in certain image capture operations.

In order to better represent images within the computer, a mathematical technique known as anti-aliasing can be applied to eliminate the jagged appearance of approximated lines, and other distortions. Anti-aliasing techniques in general attempt to smooth the line by filling in adjacent grid squares/pixels with colors that are in between the two adjoining colors. FIG. 6 illustrates how blending of the colors may smooth the line or other object out. Image manipulation techniques, such as rotation, scaling and others may make use of anti-aliasing to effectively transform the image so that it represents the original as close as possible before the transformation, as opposed to exhibiting rough and jagged lines, edges and other features.

According to embodiments of the invention in one regard, and generally speaking, triangles as one candidate for a basic geometric object in symbol set 102 have certain advantageous properties when applied to a barcode or other format. First, they occupy less physical space when compared to square symbols, since the triangle as an object has tapered sides. Second, triangles are less prone to the effects of anti-aliasing (which the scanning or other input system and subsequent image processing will introduce), as they only present three straight-lined sides versus four for a square of block shape. With the addition of white spacing 108 between symbols, the effects of anti-aliasing may in embodiments be further reduced. This yields more accurate color sampling that is closer to the original, as compared with other methods.

Figure 7:
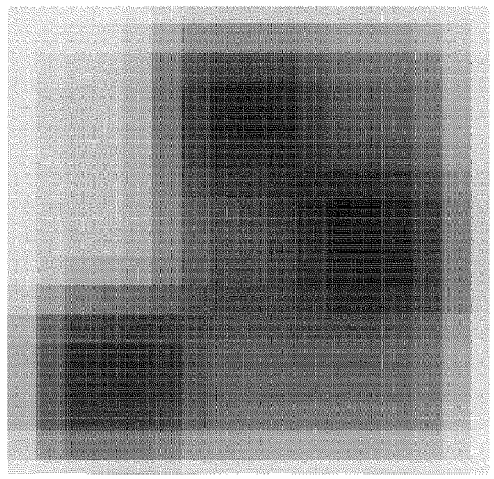
FIG. 7 illustrates aliasing and color blending effects which may be manifested in certain image capture operations.
Figure 8:
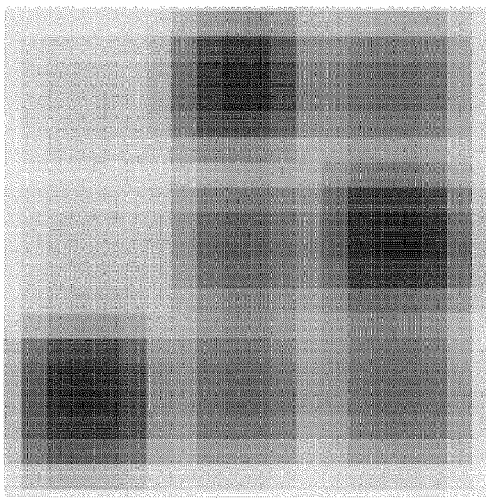
FIG. 8 illustrates aliasing and color blending effects which may be manifested in certain image capture operations in another regard.

FIG. 7 illustrates a magnified view of how square barcode cells may be affected by the process of anti-aliasing. As can be seen, the center magenta-colored cell is affected by its neighbors and its overall color is skewed from its true color due to aliasing effects. FIG. 8 in contrast illustrates that the effects of color blending may in general be reduced with the addition of intervening white spaces between barcode symbols. As can be seen, the cells are more true to the original color. However, adding a white space separator to a square barcode symbol set occupies a significantly larger amount of surface area or physical space. Again, conservation of space and increased density are important for biometric ID and other comparatively information-rich applications.

Figure 9:
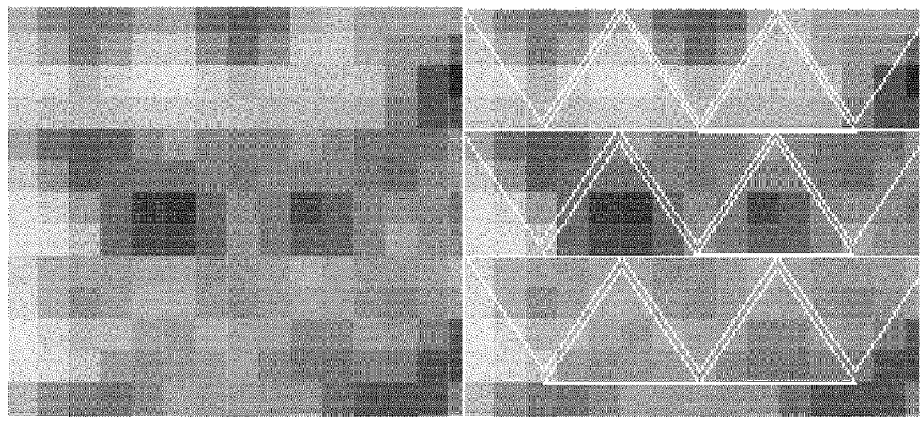
FIG. 9 illustrates aliasing effects which may be manifested in certain image capture operations, according to embodiments of the invention including triangular symbol sets.

FIG. 9 illustrates a triangular barcode symbology combined with the addition of white spacing, according to embodiments of the invention. In embodiments as illustrated, the appearance of white spacing 108 is not as pronounced as that in FIG. 8. The sample in FIG. 9 was for instance derived from a scan at a resolution of 3,300 symbols per square inch, so that actual shape of the triangle is diluted, but the sampling of the data values is accurate. The image on the right in FIG. 9 outlines the logical locations of the triangle symbols in symbol set 102 in this type of embodiment.

According to further embodiments of the invention, the symbol set 102 may be provided with a reference palette 104 containing the unique set of colors that are being used to represent or color the symbols in symbol set 102. Printers from different manufacturers and different technologies, such as inkjet, color laser or dye sublimation, produce paper output in differing color tones which may deviate from the color value which has been sent in digital form to the printer. Moreover, paper or other printed or other media may age and alter color tone, size, shape, wrinkle or otherwise deform or distort. The ink, wax, dye or other material used to imprint symbols in media may likewise fade, absorb moisture, smear or otherwise change or be altered over time. Due these and other effects and artifacts, obtaining an exact comparison between sampled color in a scan of symbol set 102 and an absolute digital or reference palette or color may be unreliable.

Figure 10:
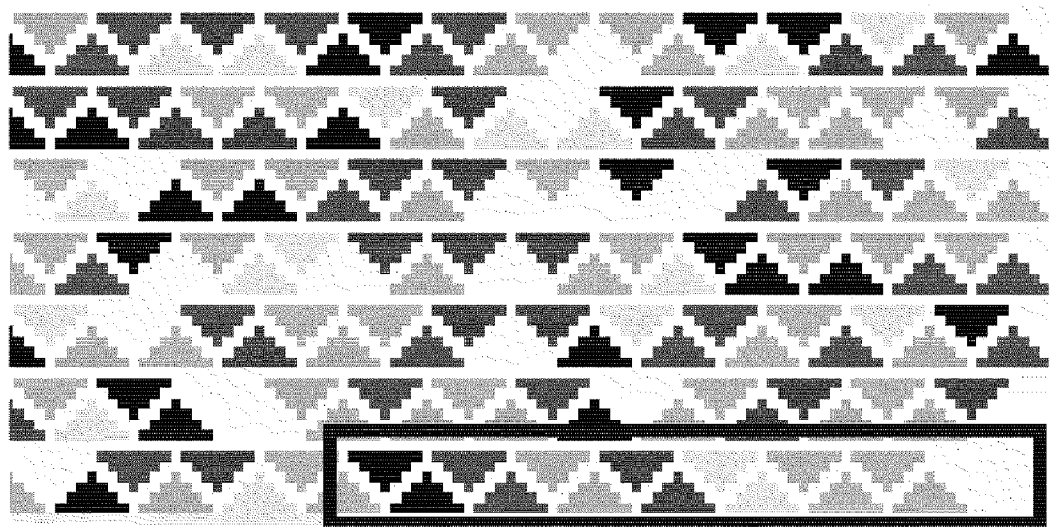
FIG. 10 illustrates a geometric symbol set including a reference palette, according to embodiments of the invention.
Figure 10:
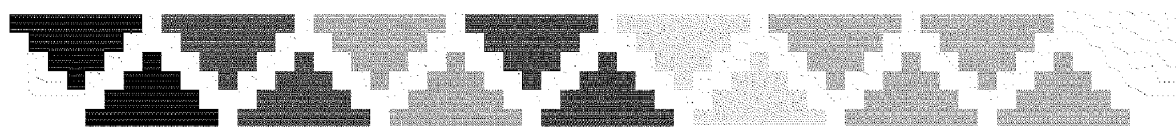

However in embodiments, and as for example shown in FIG. 10, the addition of the reference palette 104 within the structure of symbol set 102 may supply a set of physical reference colors that is self-contained and permit a calibration or reference point, so that a scan and comparison of symbol set 102 may produce highly accurate results. The reference palette 104 may in one regard allows a comparison between the scanned or sampled symbol colors and a set of reference colors, so that for example color correction may be performed. Should there be instances where the color palette is damaged or altered on the physical ID or media, the barcode or other reading intelligence may for example make an educated estimate as to what they are likely to be as it averages a history of previously read barcode palette colors, or perform other statistical or other color correction. The RGB or other value of symbols in symbol set 102 may therefore be adjusted to reflect the deviation from or remain consistent with reference palette 104, or be processed in other ways.

According to embodiments of the invention in another regard, the symbol set 102 of the invention may employ error corrective techniques to address media failure due to such things as paper blemishes, decoding misinterpretations which may occur due to spurious artifacts from the scanning technology, color reference mismatches or other sources of error or inaccuracy. The application of error correction techniques in embodiments may be desirable, since among other factors the color detection tolerances in high density variants of the symbol set 102 may be fairly strict. Therefore, according to embodiments of the invention, the decoding process of symbol set 102 may use error detecting or correcting algorithms such as Reed-Solomon error correcting codes together with the Berlekamp decoding approach. Other error detection, correction or compensation techniques may likewise be used.

In the case of Reed-Solomon implementations, that class of codes was developed in 1960 by workers Irvine Reed and Gustave Solomon at M.I.T., whose seminal article is *Polynomial Codes over Certain Finite Fields*, which publication is incorporated by reference herein. Elwyn Berlekamp from University of California Berkeley devised an efficient decoding algorithm for this class of codes, which in different implementations forms the basis of today's error correction in technologies such as hard-disk drives, compact disks and other telecommunication and other protocols. The general approach to a Reed-Solomon implementation is to encode blocks of n-bit symbols, where the number of symbols encoded in a block is m=2n−1, e.g.: a block operating on 8 bit symbols has 255 bytes. A variable amount of error corrections can be made per given block where e<m. To encode a greater amount of data than the number of bytes in a block, multiple symbols may be used. The data within each symbol may be encoded as points in a polynomial plotted over a finite field. The coefficients of the polynomial form the data in the block. The plot over-determines the coefficients, which can be recovered from the plotted points. In this way, a Reed-Solomon code can bridge a series of errors in a block of data by recovering the coefficients of the polynomial that drew the original curve. According to embodiments, the invention may permit a scanning implementation to define how many errors can be corrected per Reed-Solomon block and the composition of blocks in a given amount of data, for example, selecting multiple blocks or a single large block.

In terms of generating the barcode or other data expression represented by symbol set 102, according to embodiments of the invention in one regard an initial step of generating a CRC (Cyclic Redundancy Check) of the data to be stored in the symbol set 102 may be made, enabling a later scanning or verification phase to determine whether the encapsulated data has successfully been decoded. A CRC is a known error-detection scheme that uses parity bits generated from a polynomial and source data, and appends these bits to the original data itself. The verification of a CRC may be done by recomputing the CRC parity bits on the received data with the precomputed value to which it is appended. Should there be a discrepancy between the stored and recomputed values the data may be assumed to be corrupt.

Figure 11:
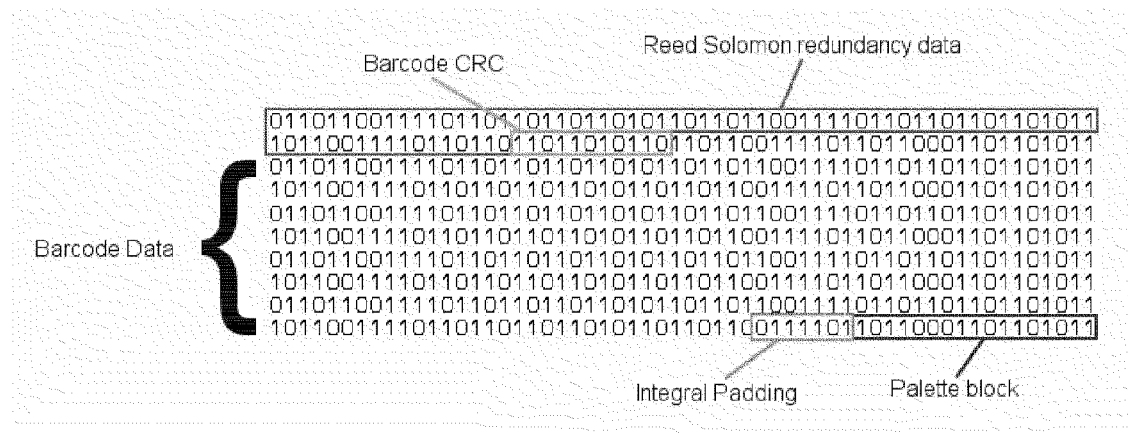
FIG. 11 illustrates data encoding including error correction encoding, according to embodiments of the invention.

As a second encoding step, the physical dimensions of the barcode or other symbol set 102 may be determined in terms of number of symbols, width, height or other dimensions. In embodiments, a fixed width or height is established and a remaining variable dimension may be computed. The dimensions may be determined based on the number of colors used (number of bits that can be represented per encoded symbol), the number of bytes of data that will be stored together with its CRC value, the additional Reed-Solomon redundancy overhead which can be computed with the known size of the data, plus the number of symbols any reference palette 104 may occupy. The number of rows of columns in the variable dimension can then be determined. Should a non-integral size of symbols in the fixed dimension occur, the difference may be padded with alternating colors from the palette being employed. FIG. 11 illustrates, for visualization purposes only, how this may be physically laid out, according to embodiments of the invention.

A next step is to Reed-Solomon encode the data with its appended CRC value that will be stored in the barcode or other symbol set 102, combined with the digital values for the color space or palette and the extra-space padded symbols. Given the computation power generally available even in typical devices such as Personal Digital Assistants, it may typically be possible to encode using one large Reed-Solomon block, rather than having to encode multiple blocks. However, block encoding choices may in one regard be left to implementation.

Figure 12:
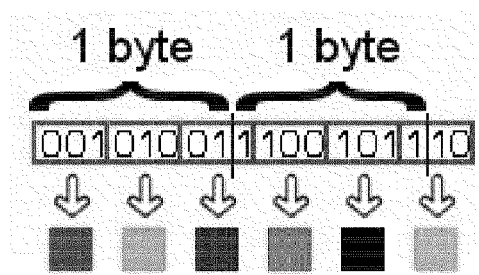
FIG. 12 illustrates data encoding representations in a color space, according to embodiments of the invention.

After any error detection or correction processing, the encoded binary data may then be decomposed into the color values that the palette can represent by generating a color based on the number of bits a barcode cell's set of colors can represent. The binary data may be segmented into blocks of this number of bits and a color value is produced for each segmented block. FIG. 12 illustrates this segmentation and color assignment process, according to embodiments of the invention in one regard. Following this, the generated colors may be assembled in the predetermined barcode dimensions in order to produce a bitmap image of symbol set 102 or other encoded output. The barcode or other image containing or expressing symbol set 102 may then be rendered or output, for example to a color printer or be embodied in an image or media containing other print information.

According to embodiments of the invention in a further regard, the corresponding processing of scanning, reading and decoding symbol set 102 may include a first step of capturing the physical image of the symbol set 102. Scanning or other input can be achieved in a variety of ways, for example by image capture via a computer flat-bed scanner, a business card reader scanner, digital camera, video camera, Web cam or other input device. The capture device may be configured to capture in color or grayscale depending on the format of the barcode or other symbol set 102, and the number of dots (or pixels) per inch that will form the image.

Generally the capture device may need to capture at least the number of pixels per inch that the image was represented when being generated into bitmap form. For example, a symbol set 102 expressed in the form of a barcode of 38 triangles wide, each 7 pixels wide with one white space pixel, forms a barcode 304 pixels wide that, when rendered to the printer, forms a barcode that is approximately one inch wide. The scanning process in such an illustrative case may need to be able to capture an area of one inch in width into approximately 300 pixels. Should a lower density scan be used, then a lower image fidelity of scanned image versus original will result and problems may arise when processing and decoding the barcode or other symbol set 102.

Figure 13:
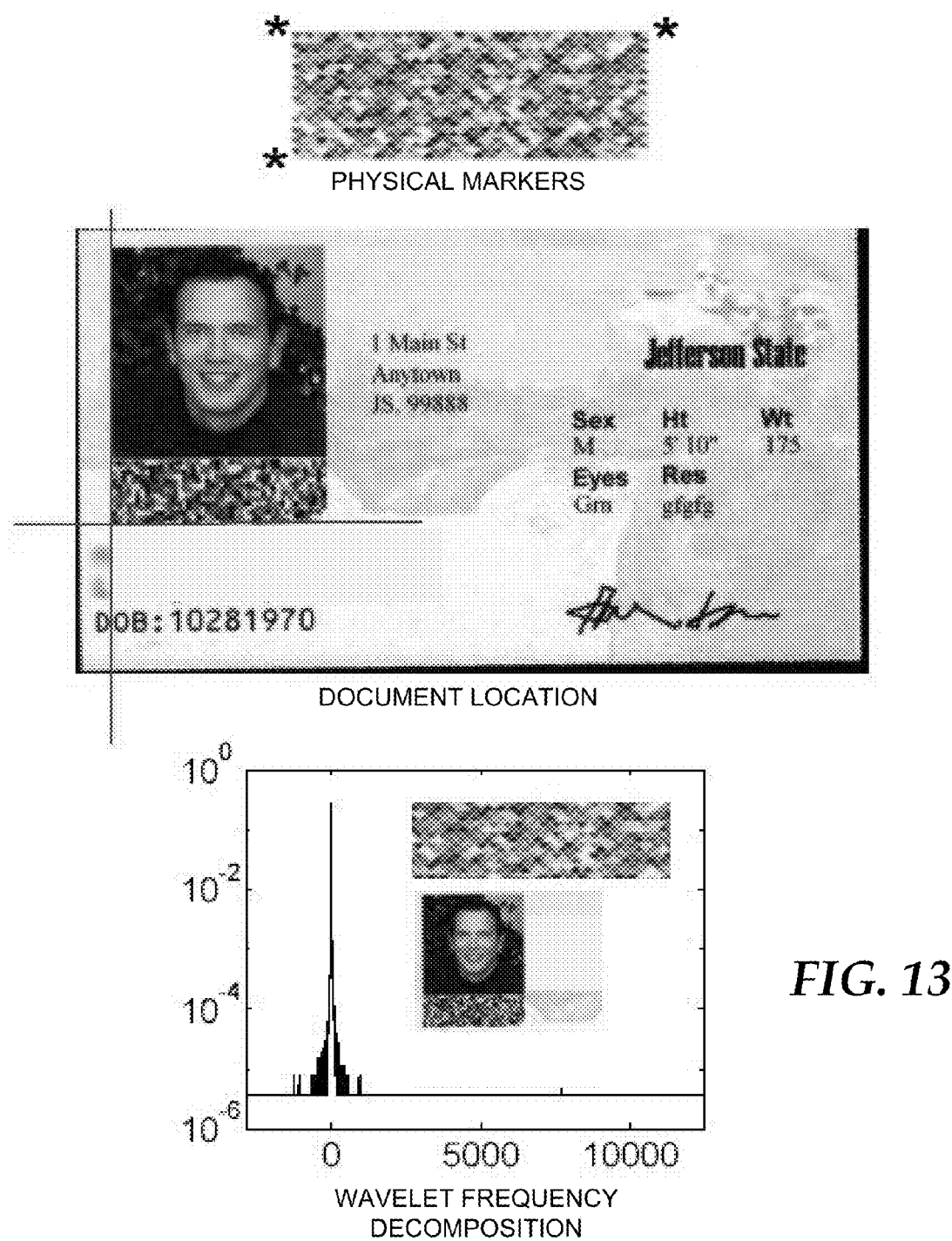
FIG. 13 illustrates data encoding in media and certain decoding processing, according to embodiments of the invention.

Once the image of the symbol set 102, and in embodiments the rest of the document or media accompanying the symbol set 102, has been captured and stored in computer or other memory or storage so that decoding processing can occur, the next step is to identify where on the document or media the symbol set 102 resides. Typically, existing barcode formats use specific alignment/location guides that are identifiable by the processing software. The symbol code 102 implemented according to embodiments of the invention is guide agnostic, given that it is a high fidelity barcode format and, based on the accompanying document's needs, tying to a specific alignment/location guide may not be visually or practically appropriate. A variety of alignment/location approaches can be used, as illustrated in FIG. 13, including, but not limited to physical markers, document position specific, and advanced computer vision pattern matching techniques, such as wavelet decomposition.

After the symbol code 102 has been identified and located within the scanned image, the decoding process may require the image of the symbol set 102 itself to be correctly rotated and scaled so that the colors of each triangle or other geometric symbol can be determined. Typically, the scanning process will produce an image that is not the exact scale of the original media, and the placement of the document within the scanner is not aligned exactly to the horizontal plane. The scaling and rotation process may be straightforwardly executed given the four corners of the extracted barcode image, using for example either trigonometric or vector based arithmetic techniques.

Figures 14, 15:
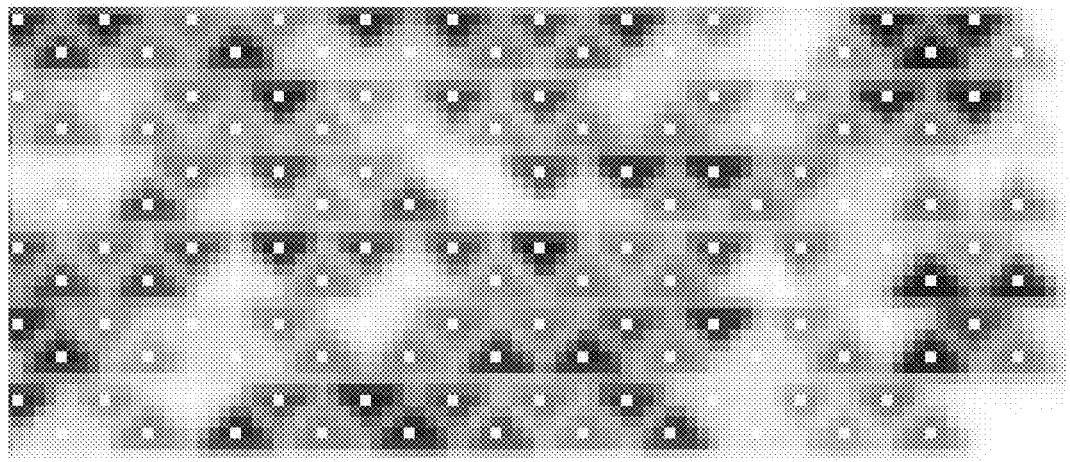
FIG. 14 illustrates image capture processing of geometric symbols including certain centering processing, according to embodiments of the invention.
FIG. 15 illustrates an equation that may be used in certain symbol separation and decoding processing, according to embodiments of the invention.

Once the final scaling and rotation of the symbol set 102 has been finalized, the sampling of the triangles or other constituent geometric symbols can be done in a variety of ways. However, the inventor has determined that one of the most accurate, or most accurate method, determined by trying different approaches without the reliance on error correction, is an absolute position single pixel sampling, followed by a color distancing comparison with the reference color values in the reference palette 104. FIG. 14 illustrates the bottom right-hand section of a processed scan of a barcode as one symbol set 102. The sampling points are denoted by the single white pixel as the sampling location. Note the reference palette at the bottom right-hand corner. Even if the pixels are sampled slightly offset from the center of the triangular symbols 106 or other geometric symbols, there is sufficient color information so that the reference color can be effectively determined.

According to embodiments in another regard, the next decoding phase is to map the sampled color values for the barcode cells to the reference palette 104 so that the original colors can be determined and the data bytes regenerated based on the bit pattern each cell represents. A modified Euclidean distance function may compare the sample color with each of the colors in reference palette 104. The smallest distance between the sample color and the palette color may consequently be the actual color that the cell or pixel represents. Given that the color of a pixel in a bitmap may in embodiments for example be represented as a range of Red 0-255, Green 0-255 and Blue 0-255, and that this range does not map perfectly to how color is actually perceived by the sensors in human eyes, a well-known phenomenon, a weighted adjustment may need to be made to reflect or compensate for this variation in perceived dynamic range. FIG. 15 shows the weighted formula for color distance measurement, considering the emphasis the human eye places on certain ranges of colors. Should the reference palette 104 be damaged, the decoding software can fill in the gaps based on a history or previously scanned palette color values, a technique which has proven to be empirically reliable.

Figure 16:
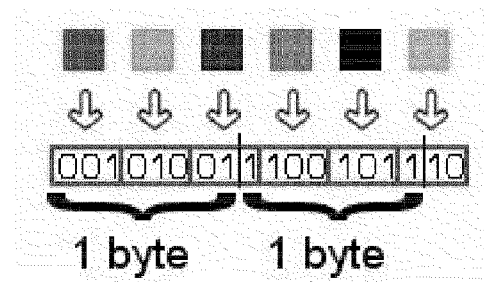
FIG. 16 illustrates data encoding representations in a color space, according to embodiments of the invention in another regard.

Reassembly of the actual data bytes from the read-out color values of symbol set 102 is in one regard essentially the reverse process of the bit segmentation in the code generation process. The bit pattern value for each cell color sequentially regenerates the data bytes. FIG. 16 illustrates this process, in which set of three symbol color values are mapped to bytes. Reed-Solomon error correction may then be applied to the resulting data bytes, to automatically detect and replace any badly scanned or color matched data values. The CRC (Cyclic Redundancy Check) parity value may then be extracted from the barcode or other data block of symbol set 102, a new CRC value may be recomputed on the remaining data. Should the values not match, then the barcode or other symbol set 102 may be determined to be either too badly damaged or the scanning process failed to faithfully reproduce the image of symbol set 102 from the scanned document or media. However, in embodiments the following adaptive techniques may be applied to accommodate input difficulties such as badly calibrated scanners or damaged barcodes, should the initial attempt at decoding the symbol set 102 fail.

Figure 17:
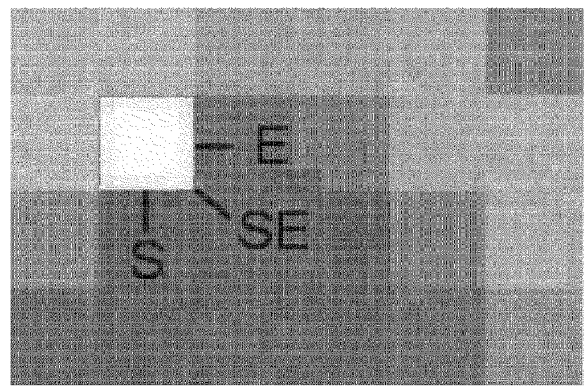
FIG. 17 illustrates certain symbol decoding operations, according to embodiments of the invention.

There are at least two factors that may dictate the decode failure of what should be a good or accurate barcode scan, namely alignment failures and color matching failures. Alignment failures can result from a poorly located barcode or other image from the original scanned image, so that therefore the sampling location is not directly within the center of the triangular or other symbols. In this case, an iterative approach may be used to offset the origin for all sampling points across the barcode or other symbol set 102, for example by one pixel in each direction of the 8 magnetic compass points. FIG. 17 illustrates this correction process on a single triangular symbol. The white pixel is the original misaligned sample point. Any point clockwise between E and S will yield a good color sample for the rest of the symbol set 102.

Figure 18:
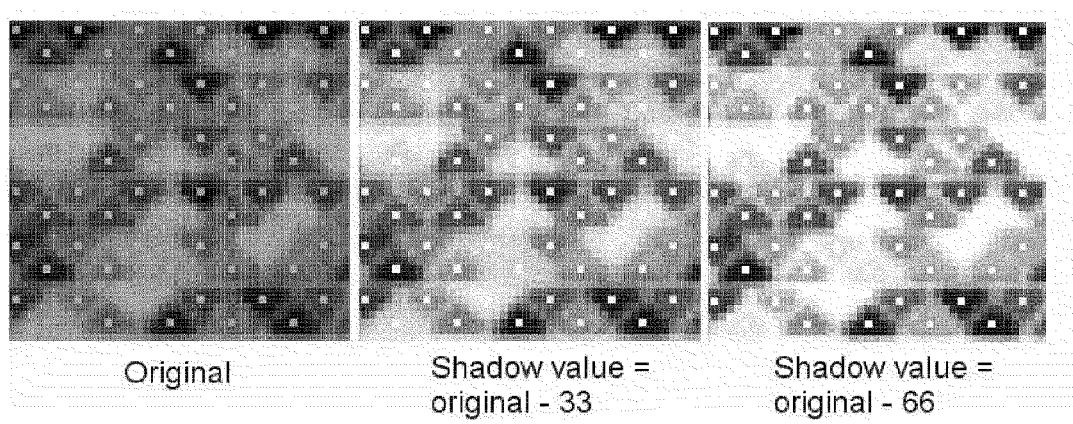
FIG. 18 illustrates certain symbol decoding operations including illumination compensation, according to embodiments of the invention.

The second potential factor is a poorly calibrated scanner or wrongly set light settings, such as contrast or brightness. In this case, the colors of the entire image of symbol set 102 may be adjusted in intensity, for example by changing the highlight component of the image. Highlight is a known image manipulation technique and is a function of Highlight/Midtone/Shadow processing or settings. Adjusting the highlight component has at least two beneficial effects. First, it lightens or darkens the original image. Second, it tends to improve the color separation and intensity of colors across the barcode or other image. This process usually yields a correct result within approximately two adjustments of highlight by −33 or other values, a process which FIG. 18 illustrates. Other techniques for correcting illumination problems are possible.

The foregoing description of the invention is illustrative, and modifications in configuration and implementation will occur to persons skilled in the art. For instance, while the invention has generally been described in terms of the extraction and processing of data encoded in a symbol set 102 embedded or printed on a drivers' license, passport, biometric ID or other transactional or identification media, in embodiments the scanned or otherwise acquired image data may be embedded on other media or material, such as CDROM, fabric or textile material, analog or digital film, or other media, material or sources. Moreover, while the invention has in instances generally been described as involving encoding triangular symbols 106 in a barcode-type of format, in embodiments other coding formats, layouts or structures may be used.

Similarly, while the invention has in embodiments been described as employing a single symbol set 102 in a given media or application, in embodiments more than one symbol set may 102 be encoded at one time on an identification or other media, for instance depending on or separated by physical areas of the media or material. Other hardware, software or other resources described as singular may in embodiments be distributed, and similarly in embodiments resources described as distributed may be combined. The scope of the invention is accordingly intended to be limited only by the following claims.

What is claimed is:

1. A method for encoding a symbol set, comprising:
receiving, at a computing device, information to be encoded in media; and
encoding, at the computing device, the information in a media as a set of colored triangular symbols including multiple row pairs that include at least a first row of colored triangular symbols pointed a first direction and a second row of colored triangular symbols pointed a second direction that is opposite the first direction, wherein a white space separator is positioned between individual row pairs within the multiple row pairs and serves as a partition between the individual row pairs.

2. A method according to claim 1, wherein the information comprises at least one of identification information, transactional information and medical information.

3. A method according to claim 2, wherein the information comprises identification information, and the identification information comprises at least one of a facial image and biometric information.

4. A method according to claim 3, wherein the biometric information comprises at least one of an iris scan, a thumbprint scan, a fingerprint scan and a DNA sample representation.

5. A method according to claim 1, wherein the set of colored triangular symbols includes additional verification information so that a content of the information encoded in the set of colored triangular symbols may be validated upon subsequent decoding of the set of colored triangular symbols using a cyclic redundancy check.

6. A method according to claim 1, wherein the colored triangular symbols include a subset of colored triangular symbols that form a reference color palette for verifying particular colors of individual colored triangular symbols in the set of colored triangular symbols.

7. A method for encoding a symbol set, comprising:
receiving, at a computing device, information to be encoded in media;
encoding, at the computing device, the information in a set of colored triangular symbols including multiple row pairs that include at least a first row of colored triangular symbols pointed a first direction and a second row of colored triangular symbols pointed a second direction that is opposite the first direction in a color space in the media; and
inserting a white space separator between individual row pairs to serve as a partition between the individual row pairs.

8. A method according to claim 7, wherein the information comprises at least one of identification information, transactional information and medical information.

9. A method according to claim 8, wherein the information comprises identification information, and the identification information comprises at least one of a facial image and biometric information.

10. A method according to claim 9, wherein the biometric information comprises at least one of an iris scan, a thumbprint scan, a fingerprint scan and a DNA sample representation.

11. A method according to claim 7, wherein the color space comprises at least one of a set of grayscale values and a set of color values.

12. A method according to claim 7, wherein the set of colored triangular symbols includes additional verification information so that a content of the information encoded in the set of colored triangular symbols may be validated upon subsequent decoding of the set of colored triangular symbols using a cyclic redundancy check.

13. A method according to claim 7, wherein the colored triangular symbols include a subset of colored triangular symbols that form a reference color palette for verifying particular colors of individual colored triangular symbols in the set of colored triangular symbols.

14. A method according to claim 7, wherein the set of colored triangular symbols further comprises a reference palette.

* * * * *